United States Patent
Peterson

[15] 3,669,492
[45] June 13, 1972

[54] RECLINING CAR SEAT

[72] Inventor: Arnold E. Peterson, Glendale, Calif.
[73] Assignee: Peterson Baby Products, Hollywood, Calif.
[22] Filed: May 27, 1971
[21] Appl. No.: 147,540

[52] U.S. Cl..............................297/253, 297/256, 297/329
[51] Int. Cl........................................................A47d 1/10
[58] Field of Search..............297/253, 250, 254, 256, 321, 297/343, 329, 325

[56] References Cited

UNITED STATES PATENTS

| | | | |
|---|---|---|---|
| 2,208,392 | 7/1940 | Sadler | 297/256 |
| 3,712,346 | 7/1955 | Sprinkle | 297/343 |
| 3,094,356 | 6/1963 | Burke | 297/254 |
| 3,572,827 | 3/1971 | Merelis | 297/253 |

*Primary Examiner*—Francis K. Zugel
*Attorney*—Spensley, Horn & Lubitz

[57] ABSTRACT

An infant car seat with its own headrest so constructed that it is pivoted from the upper end and is capable of being moved to a reclining position from the standard sitting position without interfering with the top of the automobile seat on which it is mounted or the headrest associated with such an automobile seat. The invented infant seat is also constructed to provide a rugged and safe infant car seat which because of the unique pivoting structure can be compactly folded for storage, handling or shipping.

8 Claims, 7 Drawing Figures

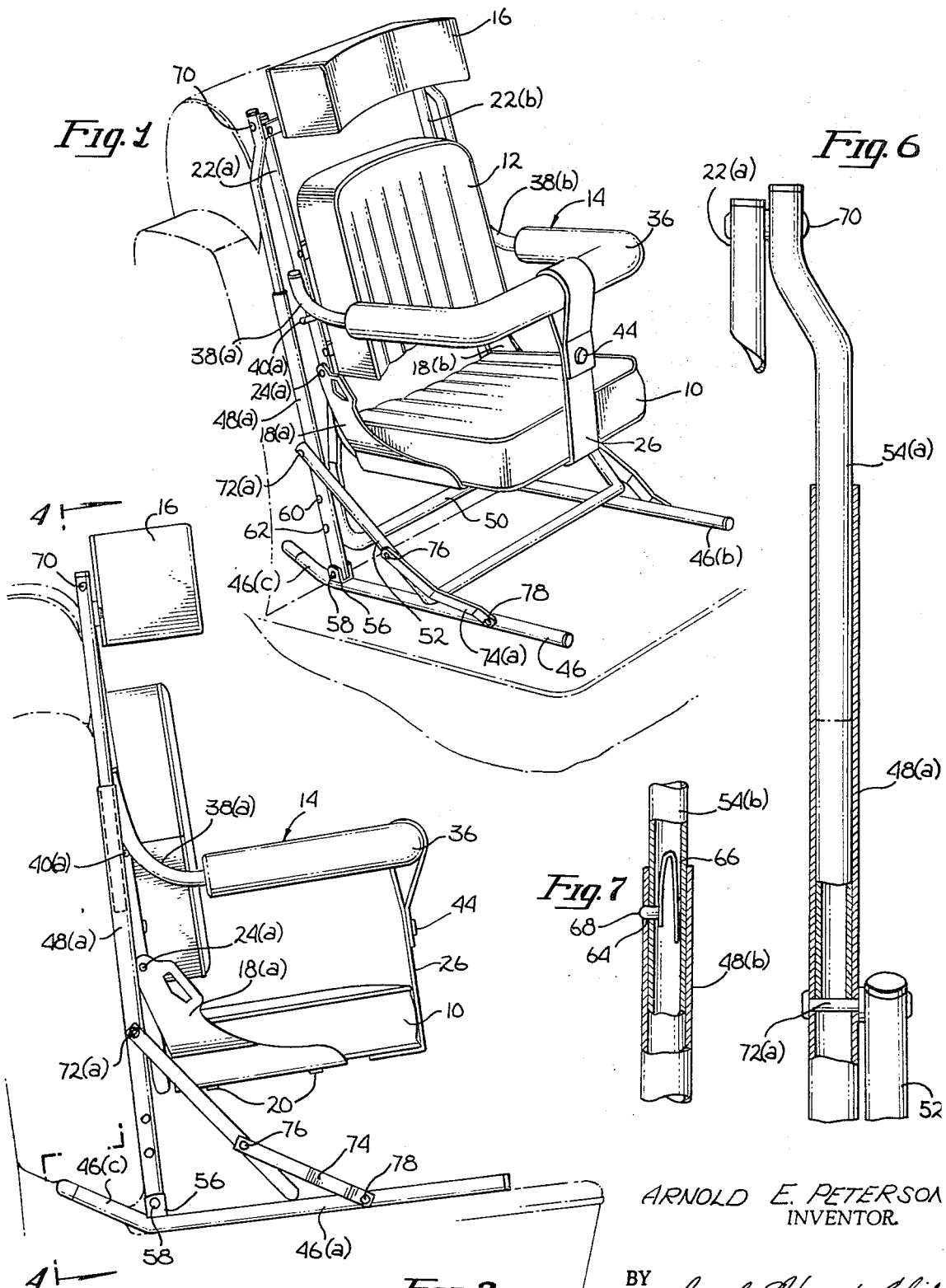

PATENTED JUN 13 1972

ARNOLD E. PETERSON
INVENTOR.

BY
Spensley, Horn & Lubitz
ATTORNEYS

RECLINING CAR SEAT

BACKGROUND OF THE INVENTION

1. Field of the Invention

The present invention relates generally to infant car seats which are normally mounted on an automobile seat and more specifically to infant car seats which are easily moveable from a sitting position to a reclining position.

2. Description of the Prior Art

In the past infant car seats have been available that either had only one position (e.g., a sitting position) or else they had structure which allowed the infant seat to change positions in automobiles that had low backs to the seats and/or no automobile headrests attached to the car seats. In most modern automobiles headrests or high headrestraints are standard equipment and thus the variable position infant seats of the prior art could not be fully utilized without interference with or removal of the headrests (if possible) on such automobile seats. The manner in which the prior art seats were constructed and pivoted caused the upper portion or headrest assembly of the infant seat to extend substantially beyond the plane defined by the back of the automobile seat.

SUMMARY OF THE INVENTION

The present invention involves novel structure which allows an infant seat to be easily moved to either of two positions while mounted on an automobile seat without the interference problems, described above, which are inherent in the prior art structures. The unique suspension and mounting system utilized allow the infant seat to be pivoted around a point at the upper end of the infant seat so that when the infant seat is in the reclining position the upper end or headrest of the infant seat does not move substantially beyond the plane defined by the back of the automobile seat and/or the fixed headrests or headrestraints. The invented infant seat utilizes a telescoping rail and sleeve arrangement in conjunction with positive locking mechanisms in the various positions to provide a safe, rugged and easily maneuverable device. The unique arrangement of the various pivot points and the combined structure of the supporting frame members allow for easy changes in position while the infant seat is mounted in the automobile and easy folding when the invented infant seat is not in use.

The unique structure and the resultant advantages of the present invention will be better understood from the description of the drawings and the detailed explanation of the preferred embodiment which follow below.

BRIEF DESCRIPTION OF THE DRAWINGS

The following is a description of the drawings:

FIG. 1 is a perspective view showing the invented infant car seat in the sitting position and mounted on a typical automobile seat, the latter being shown in phantom lines;

FIG. 2 is a left side elevational view of the infant car seat shown in FIG. 1;

FIG. 6 is an enlarged partial cross-sectional view taken along line 6—6 of FIG. 3 showing the telescoping rail and sleeve arrangement, upper pivot arrangement and the lower rail stop structure for a preferred embodiment of the invented infant seat; and FIG. 7 is an enlarged partial cross-sectional view taken along line 7—7 of FIG. 4 showing the preferred spring actuated detent locking arrangement used to lock the infant seat in the sitting position.

DESCRIPTION OF THE PREFERRED EMBODIMENT

Figure 5:
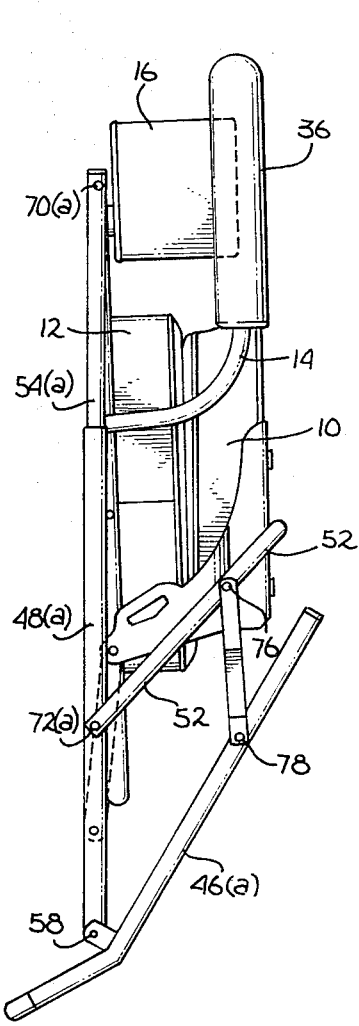
FIG. 5 is a left side elevational view showing the invented car seat of FIG. 1 in its folded or collapsed position.

With reference to FIG. 1, it can be seen that the inner assembly of the invented car seat is comprised of the following major components; a chair seat 10, a chair back 12, a guard rail assembly 14 and a headrest 16. These major components are assembled in a unique combination with suitable mounting and supporting members and an outer frame structure to provide a rigid car seat which can be used in one position as a conventional car seat (see FIGS. 1 and 2) and in a second position as a reclining seat (see FIG. 3). Also, if desired the invented car seat can be easily folded, as shown in FIG. 5, to provide a compact assembly which can be easily carried or stored without occupying a great deal of space. The unique structure of the invented car seat assembly allows the car seat to be used in the conventional and reclining positions in all model automobiles including those that have headrests affixed to the seats. As previously discussed, the prior art car seats which allowed optional changes in positions were constructed so that they could not be used in the reclining positions in newer model automobiles having headrests affixed to the seats because when in the reclining position the headrest of the car seat and/or the upper portion of the car seat interfered with the headrest on the seat of the automobile. The invented structure in a preferred embodiment will now be described in detail.

Beginning with the inner seat assembly, there is a chair seat 10 which is a conventional cushion type seat having a vinyl plastic covering or a covering of some other durable fabric. A pair of substantially L-shaped hinge members 18(a) and 18(b) are secured to the bottom of the seat by fasteners 20 (see FIG. 2). The vertical portion of the L-shaped hinges are slightly bowed outwardly to provide sufficient clearance when the seat 10 is lifted. A U-shaped tubular support 22 is provided for mounting various portions of the inner seat assembly. The support 22 is comprised of two vertical portions 22(a) and 22(b) and a horizontal portion 22(c). The upper portion of the hinges 18(a) and 18(b) are pivotally attached to vertical support portions 22(a) and 22(b) at points 24(a) and 24(b), respectively. A retaining strap 26 is also centrally attached to the bottom of seat 10 at the forward end thereof. The horizontal tubular support member 22(c) acts as a mechanical stop for seat 10 when it is lowered by pivoting the seat around points 24(a) and 24(b). (See FIG. 4). Seat 10 when lowered is substantially perpendicular to the chair back 12.

The chair back 12 is also of the conventional cushion type having a vinyl plastic or other suitable fabric covering. The back member 12 is secured by conventional means (rivets, screws, etc.) to the tubular support members 22(a) and 22(b) by mounting members 28(a) and 28(b), respectively.

Figure 4:
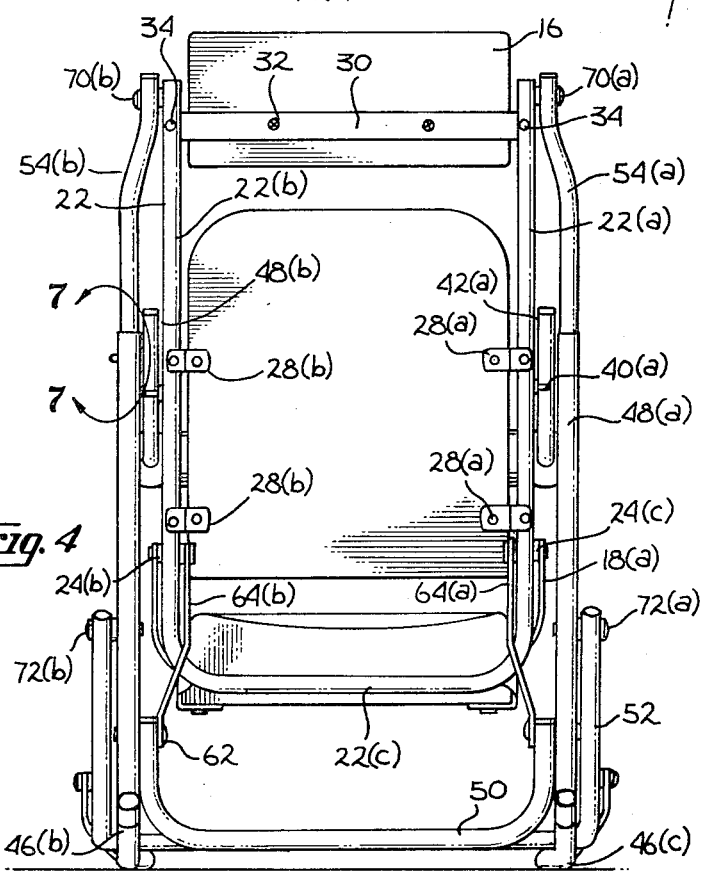
FIG. 4 is a rear elevational view of the infant seat shown in FIG. 2 and viewed along the line 4—4 of FIG. 2.

As best shown in FIG. 4, the headrest 16 is preferably contoured for the comfort of the user and is of the same cushion type construction previously described for the seat 10 and back 12. The headrest is mounted to a bar 30 by screws 32, or the like, and then the bar 30 is secured to the tubular supports by rivets 34, or the like.

A guard rail 14 having a cushioned or padded portion 36 is pivotally connected at 42(a) and 42(b) to the tubular support members 22(a) and 22(b), respectively. The forward portion of the guard rail 14 housing the padded portion 36 is U-shaped. The side portions 38(a) and 38(b) of the guard rail 14 are curved to form one-half of a U-shaped member on axes, generally perpendicular to that defined by the padded portion 36. A pair of mechanical stops 40(a) and 40(b) are rigidly secured to the tubular support members 22(a) and 22(b), respectively. The stops 40(a) and 40(b) act to limit the downward motion of the guard rail 14 by mechanically contacting the side portion 38(a) and 38(b), as shown in FIGS. 1–4. When the guard rail 14 is fully lowered it is in contact with the stops 40(a) and 40(b), the padded portion 36 of the guard rail is substantially parallel with the plane of the seat 10.

Since the guard rail 14 is pivotally connected it can move upwardly, i.e., away from the stops 40(a) and 40(b). In order to retain the guard rail in the downward position the retaining strap 26 is passed over the padded portion 36 and fastened by means of a snap type fastener 44, or the like. When it is desired to place the infant in the car seat it is usually desirable to unfasten the retaining strap and move the guard rail upwardly until the padded portion 36 contacts the headrest 16, the infant is then placed on the seat 10 without any interference, the guard rail can then be fully lowered and the retaining strap 26 is then fastened with the snap 44. The retaining strap 26 is usually positioned so that it passes between the legs of the infant and thus acts as a crotch strap to prevent the infant from sliding off the seat. The guard rail 14 when secured by the retaining strap 26 protects the child from falling forward by providing a rigid but safely padded barrier 36. To remove the infant from the car seat it is usually desirable to reverse the steps described above for placing the infant in the car seat.

The outer frame structure for the invented car seat assembly is comprised mainly of a pair of bottom rails 46(a) and 46(b), a pair of vertical sleeve members 48(a) and 48(b), a U-shaped tubular supporting member 50, another U-shaped supporting member 52 and slideable rails 54(a) and 54(b). The novel arrangement and structure of the outer frame assembly in conjunction with the inner car seat assembly, previously described, provides the unique advantages over the prior art since it allows the invented car seat to be moved to either of the positions shown in FIGS. 2 and 3 without interfering with the headrest or upper portion of the actual automobile seat shown in phantom lines. Also, the overall construction of the invented car seat assembly allows for compact folding as shown in FIG. 5 and provides a safe infant car seat which is extremely rugged and yet of relatively simple construction.

The outer frame structure is preferably configured in the following manner. The bottom rails 46(a) and 46(b) are formed with upwardly end portions 46(c) and 46(d), respectively. The vertical sleeve members 48(a) and 48(b) are each pivotally secured to one of the bottom rails by means of a bracket 56 and pin 58. The U-shaped supporting member 50 is of a suitable width to be disposed between the sleeves 48(a) and 48(b) and the vertical portions of member 50 are secured to the sleeves by suitable fasteners 60 and 62 (e.g., rivets, etc.). The fasteners 62 are slightly longer than fasteners 60 and serve as pivotal connections for the brace members 64(a) and 64(b) which are positioned at points substantially below the upper pivot points 70(a) and 70(b). Brace members 64(a) and 64(b) are pivotally mounted on both ends so that one end is mounted at the fasteners 62 on sleeves 48(a) and 48(b) and the other end is mounted at pivots 24(a) and 24(b). The rails 54(a) and 54(b) are of smaller diameter than sleeves 48(a) and 48(b) and are designed to slide in the sleeves in a telescopic manner, as shown in FIG. 6.

One of the sleeves (e.g., 48(b)) is provided with an opening 64, as shown in FIG. 7, and one of the rails (e.g., 54(b)) is designed to contain a spring member 66 with a protrusion 68 so that when the rail 54(b) is sliding in the sleeve 48(b) there is one position at which the protrusion 68 will engage the opening 64 by virtue of the spring 66. The protrusion 68 and opening 64 provide a detent type locking arrangement so that when the invented car seat is in the position shown in FIG. 2, the sleeve 54(b) will be locked in position. Since the rails 54(a) and 54(b) are in the raised position some positive locking mechanism, such as the detent arrangement, is desirable to insure that the position of the infant seat is not accidentally changed by vibration, unintentional movements, shock or the like. Although only one locking mechanism is needed, the same type of locking arrangement described above could also be installed for the other sleeve 48(a) and rail 54(a).

The rails 54(a) and 54(b) are bent inwardly on their upper ends (see FIGS. 4 and 6) so that they can be disposed substantially in contact with the vertical portions 22(a) and 22(b) of the inner assembly tubular supports. The rails 54(a) and 54(b) are pivotally mounted at their upper ends to vertically support members 22(a) and 22(b), respectively by means of pins 70(a) and 70(b) or similar pivoting means.

Figure 3:
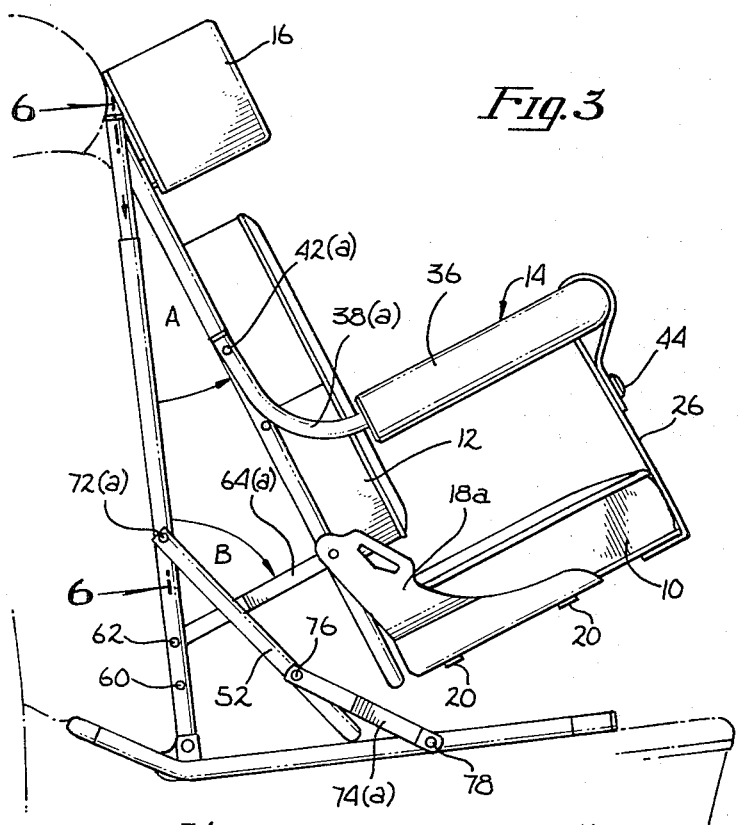
FIG. 3 is a left side elevational view of the invented infant car seat in the reclining position and mounted on a typical automobile seat, the latter being shown in phantom lines.

The vertical portions of the U-shaped member 52 are pivotally mounted to the sleeve members 48(a) and 48(b) by pins 72(a) and 72(b) or similar pivoting means. At points intermediate the ends of each of the vertical portions of members 52 one end of links 74(a) and 74(b) are pivotally mounted by means of pivot pins 76 or the like. The other ends of link 74(a) and 74(b) are pivotally mounted at a point intermediate the ends of the bottom rails 46(a) and 46(b) by pivot pins 78. The U-shaped supporting member 52 in conjunction with the links 74(a) and 74(b) form an over center toggle link arrangement which gives the whole infant seat assembly rigidity when the bottom or horizontal portion of 52 is locked in contacting engagement with the bottom rails 46(a) and 46(b) as shown in FIGS. 2 and 3. The member 52 is locked into position or unlocked by applying force in the proper direction on the links 74(a) and 74(b).

The entire invented infant car seat is secured to a standard automobile car seat by inserting the sloped portions of the bottom rails 46(c) and 46(d) in the opening between the back and seat portions of the automobile seat. When the infant seat is properly installed, the sloped portions 46(c) and 46(d) are wedged and locked under the bottom of the back portion of the automobile seat with the seat portion of the automobile seat supporting and urging the bottom rails 46(a) and 46(b) upwardly so that portions 46(c) and 46(d) tend to remain wedged in position.

To position the infant seat in the conventional sitting position one lifts the two sliding rails 54(a) and 54(b) until the spring actuated protrusion 68 mates with the opening 64 in sleeve 48(b) thus locking the seat in position. In this position, as shown in FIGS. 1 and 2, the sleeves 48(a) and 48(b), the rails 54(a) and 54(b) and the vertical supporting members 22(a) and 22(b) are substantially parallel to one another. Also, the pivotable brace members 64(a) and 64(b) are in a substantially vertical position.

To position the infant seat in the reclining position, which is conducive to napping, the protrusion 68 is depressed and the slideable rails 54(a) and 54(b) are moved downwardly thus causing the rails to pivot about the pivot points 70(a) and 70(b). The rails 54(a) and 54(b) slide downwardly in sleeves 48(a) and 48(b) until they engage pin members 72(a) and 72(b) which serve as mechanical stops to limit the movement of the rails, thereby locking the infant seat in the reclining position. The pivotable brace members 64(a) and 64(b) are caused to move to a position which forces the inner assembly to assume the desired angle "A" which is about 30° with respect to the telescoping sleeve and rails as shown in FIG. 3. The angle "A" which the inner infant seat assembly assumes can be modified by varying the length of the brace members 64(a) and 64(b) and/or by changing the location of the pin members 72(a) and 72(b) which directly determines the angle "B" that the brace members 64(a) and 64(b) makes with sleeves 48(a) and 48(b) and thus also indirectly determines the angle "A" of the inner infant seat assembly.

By pivoting around the upper end (at pivot points 70(a) and 70(b)) the top of the invented infant seat including the infant headrest assembly does not interfere with the top of the automobile seat or the headrests normally positioned on the front seat of most newer model automobiles. The construction of the prior infant seats generally involved a construction in which the pivot point for changing positions of the infant seat was considerably below the upper end of the infant seat, thus causing the upper portion of the infant seat (e.g., the infant's headrest) to move into and to interfere with the automobile headrest since the top of the infant seat was forced to extend beyond the plane defined by the outer back portion of the automobile's front seat.

In addition to the structural advantages, described above, for obtaining a rigid and safe infant seat which can be readily moved to either of two positions, the invented car seat is so constructed that it can be compactly folded for carrying, storage or shipment. This folding capacity is best illustrated in FIG. 5 where it can be observed that a compact folded unit is achieved by moving the guard rail 14 to its uppermost position, by lifting the seat 10 to its uppermost position, and by unlocking links 74(a) and 74(b) thus allowing the U-shaped member 52 to be pivoted upwardly so that the horizontal portion of member 52 engages the bottom of seat 10 and also allowing the bottom rails 46(a) and 46(b) to pivot around pins 58 to a position determined by the contact of member 52 with the bottom of seat 10.

While the invented infant seat has been described with respect to the preferred embodiment illustrated and described above, it is not intended that the invention be so limited since it will be apparent to those skilled in the art that various modifications within the teachings of the invention can be made to the structure of the preferred embodiment.

I claim:

1. An infant seat assembly comprising:
   a. a pair of spaced substantially parallel vertical supporting means for mounting a cushion type chair seat and chair back, said chair seat being pivotable to a position substantially perpendicular to said chair back and pivotally secured to said vertical supporting means;
   b. a pair of spaced substantially parallel slideable rail members pivotally secured to said pair of vertical supporting means at the upper ends of both said rail members and said vertical supporting means;
   c. a pair of substantially parallel sleeve members adapted to receive said slideable rail members in a telescopic manner;
   d. a pair of braces each brace being pivotally mounted between each of said rail members and said vertical supporting means, said brace members being pivotally disposed at a distance substantially below the upper pivot points of said rail members and said vertical supporting means;
   e. a pair of spaced substantially parallel bottom rail members each bottom rail member being pivotally mounted to one of said sleeve members;
   f. means for providing rigidity between said telescopic rail and sleeve members and said bottom rails, said means being pivotally mounted to said sleeve members so that in one position a portion of said means contacts said bottom rails to cause said telescopic rail and sleeve members to be substantially perpendicular to said bottom rails; and
   g. stop means in the lower end of said sleeve members for limiting the downward position of the lower ends of said rail members within said sleeve adapted so that when said rail members contact said stop means the position of said brace means is fixed and causes said vertical supporting means to pivot with respect to said rail members at the upper ends thereof to cause the chair seat to assume a sloping position with respect to the horizontal.

2. The infant seat assembly of claim 1 in which a headrest is mounted on the upper end of said vertical supporting means.

3. The infant seat assembly of claim 2 in which a guard rail is pivotally mounted to said vertical supporting means, mechanical stops are provided on said vertical supporting means for limiting the downward movement of said guard rail and a retaining strap is secured between said chair seat and said guard rail to hold said guard rail in a position substantially parallel to said chair seat.

4. The infant seat assembly of claim 2 in which a locking means is provided in at least one of said slideable rail members for limiting the upward movement of said rails in said sleeves so that when said locking means is actuated the position of said slideable rails has caused the pivotable brace means and pivotally vertical supporting means to assume positions substantially parallel to said telescoping rails and sleeves whereby said chair seat is substantially parallel to the horizontal.

5. The infant seat assembly of claim 4 in which said locking means comprises a spring loaded protrusion disposed in said rail member and an opening in said sleeve member to mate with said protrusion when the rail and sleeve are properly aligned.

6. The infant seat assembly of claim 2 in which said means for providing rigidity comprises a U-shaped member adapted so that the horizontal portion of the U-shaped member contacts said bottom rails.

7. The infant seat assembly of claim 6 in which a link is pivotally mounted on each of the vertical portions of said U-shaped member to provide an over center toggle configuration.

8. The infant seat assembly of claim 2 in which said bottom rails have upwardly sloping rear portions adapted to engage and hold said infant seat assembly to an automobile seat.

* * * * *